United States Patent [19]

Baker

[11] Patent Number: 5,056,411

[45] Date of Patent: Oct. 15, 1991

[54] COURSE RECOMMENDATION DISPLAY

[75] Inventor: Michael O. Baker, Hampshire, England

[73] Assignee: GEC-Macroni Limited, Stanmore, England

[21] Appl. No.: 406,907

[22] Filed: Sep. 14, 1989

[30] Foreign Application Priority Data

Sep. 15, 1988 [GB] United Kingdom ............ 8821570

[51] Int. Cl.$^5$ ............................ F41G 3/02; F41G 3/06
[52] U.S. Cl. ........................... 89/41.22; 89/41.14; 89/41.07; 89/41.08
[58] Field of Search ............... 89/41.05, 41.06, 41.07, 89/41.08, 41.03, 41.14, 41.21, 41.22; 364/461, 462

[56] References Cited

U.S. PATENT DOCUMENTS

| | | | |
|---|---|---|---|
| 3,188,631 | 6/1965 | Birtley | 364/462 |
| 3,293,641 | 12/1966 | Bennett et al. | 364/461 |
| 3,869,601 | 3/1975 | Metcalf | 364/449 |
| 4,086,632 | 4/1978 | Lions | 364/444 |
| 4,145,952 | 3/1979 | Tye | 364/423 |
| 4,196,474 | 4/1980 | Buchanan et al. | 364/461 |
| 4,466,068 | 8/1984 | Degre et al. | 364/461 |
| 4,590,569 | 5/1986 | Rogoff et al. | 364/452 |
| 4,623,966 | 11/1986 | O'Sullivan | 364/461 |
| 4,706,090 | 11/1987 | Hashiguchi et al. | 364/461 |
| 4,764,873 | 8/1988 | Libby | 364/461 |

FOREIGN PATENT DOCUMENTS

| | | |
|---|---|---|
| 0020269 | 5/1980 | European Pat. Off. . |
| 0117130 | 8/1984 | European Pat. Off. . |
| 61-20874 | 1/1986 | Japan ............. 364/461 |
| 8802841 | 4/1988 | PCT Int'l Appl. ........... 89/41.03 |
| 2020938 | 11/1979 | United Kingdom . |
| 2093306 | 8/1982 | United Kingdom . |
| 2154109 | 8/1985 | United Kingdom . |

Primary Examiner—Deborah L. Kyle
Assistant Examiner—Stephen Johnson
Attorney, Agent, or Firm—Fleit, Jacobson, Cohn, Price, Holman & Stern

[57] ABSTRACT

A display system for command and control system for a vessel, the system including a visual display unit (VDU), and means for providing to the VDU signals for providing a display having coordinates of vessel heading and time, with areas of the display indicating certain heading constraints which areas should be avoided by the commander when selecting his course.

7 Claims, 4 Drawing Sheets

COURSE RECOMMENDATION DISPLAY

FIELD OF THE INVENTION

The present invention relates to a course recommendation display for a command and control system on board ship. This will be described here in the context of a Naval surface ship, but is also applicable to any vessel such as merchant surface ships, submarines, or hovercraft. For the purposes of this specification, "vessel" is intended to means any structure which can float in or to adjacent water.

BACKGROUND ART

FIG. 1 shows schematically a typical command and control system for a small naval vessel. One essential function of such a system is to organise and present to the Commanding Officer the information he requires in order to make tactical decisions concerning the allocation of weapons to targets and for manoeuvring the ship. This information is derived from sensors on board the ship such as the surveillance radar and sonar, and also from encyclopaedic data and from external sources including sensors on other ships or aircraft, transmitted via a data link. Information is presented on an electronic graphical display console in the form of a plan view display of the world around the ship.

Factors which have to be considered by the commander to manoeuvre his ship in a practical battle situation include weapon and sensor blind arcs, the direction, range and speed of approach of threats and the positions of other vessels which may pose a risk of collision. For example a missile system mounted at the back of a ship cannot be used to engage targets within a forward facing arc because it is obstructed by the superstructure of the ship as illustrated by FIG. 2. A radar may be similarly obstructed. These areas in which a weapon or sensor system is ineffective are termed 'blind arcs' and impose constraints on the ships heading to ensure that all threats can be engaged successfully without the targets allocated to each weapon entering the blind arc of the tracking radar or the weapon.

A problem arises in that a plan view display is not always the most convenient form of presentation, and it becomes difficult for the commander to recognise manoeuvre options from this kind of display when there are several potential problems to consider simultaneously. This situation may arise for example if there are two or more targets to be engaged and also possibly a collision risk to be considered. A simple plan view display can be made to present all of the necessary information, including the relative positions and velocities of targets and other objects, and the weapon and sensor system coverage, but in the plan-view form it can be difficult to recognise the options available for the best course to steer.

Other forms of display are in common use. For example it is common practice in submarine command and control systems to present active sonar information in cartesian coordinates of range and bearing and to present sensor information representing the position and possibly the velocity of objects such as other ships and aircraft.

SUMMARY OF THE INVENTION

The purpose of this invention is to present information required for manoeuvring decisions in a form which makes the situation clear and easy to assimilate.

The present invention provides a display system for a command and control system for a vessel, the system including a visual display unit (VDU), and means for providing to the display unit signals for generating a display having coordinates of vessel heading and time, with areas of the display representing certain heading constraints, which areas should be avoided by the commander when selecting his course.

The display in accordance with the invention represents the manoeuvring constraints imposed by other objects, rather than the physical positions of the objects. In the case of a naval vessel, each constraint is imposed by a particular weapon allocation or collision risk. These constraints are presented graphically in a two dimensional picture by regions which represent heading limits and the time over which the limits apply. Any convenient form of presentation could be employed, but the preferred method has cartesian coordinates of heading and time, and indicates headings which should be avoided by regions whose width indicates the heading constraint and height indicates the time for which that constraint applies. In this form it is possible to recognise at a glance how to steer the ship, when to steer and how much time is available within which to make manoeuvres.

This form of display is also applicable to merchant ships for collision avoidance, particularly for large vessels with slow steering response where early assessment of collision risks is essential.

Brief Description of the Drawings

The invention will now be further explained with reference to the accompanying drawings, wherein.

DESCRIPTION OF THE PREFERRED EMBODIMENTS

Figure 1:
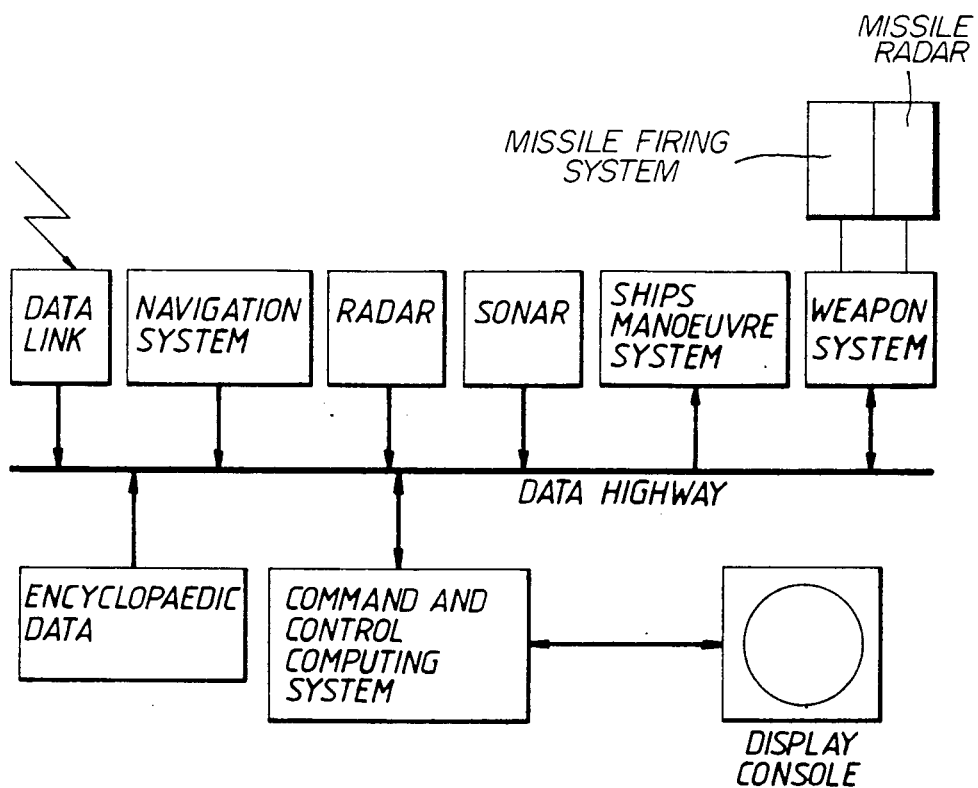
FIG. 1 is a schematic view of the command and control system for a naval vessel.
Figure 2:
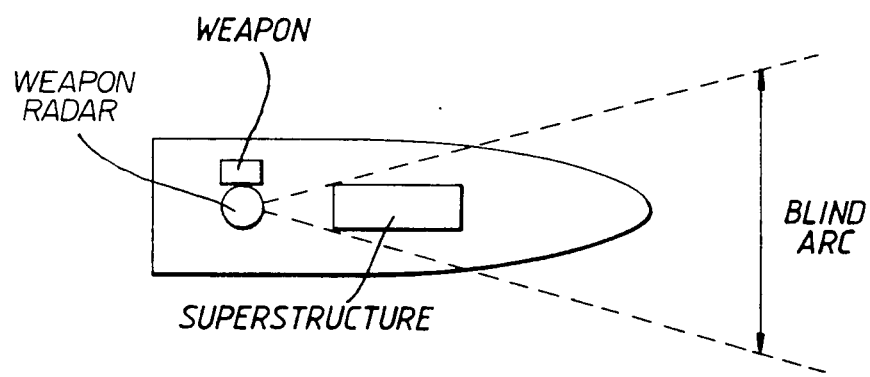
FIG. 2 is a schematic view of a naval vessel illustrating the problem of a blind arc of a weapon system.
Figure 3:
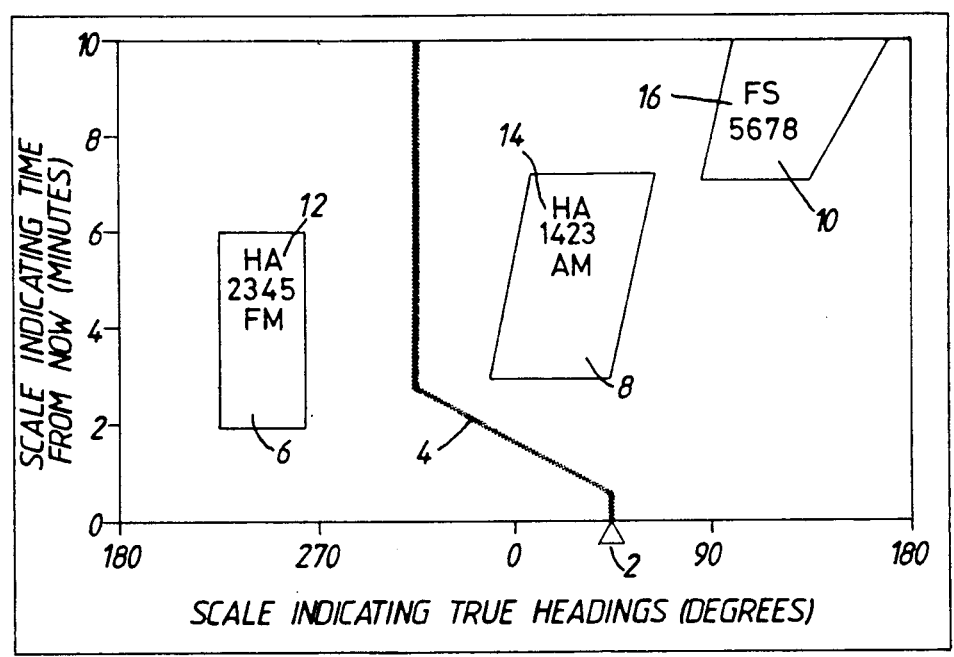
FIG. 3 is a view of a VDU in a control system in accordance with the invention having a typical display thereon.

Referring now to FIG. 3, the horizontal axis of the display represents true heading in terms of compass bearing, and the vertical axis represents time in the future with 'now' at the bottom of the display. The present heading of the ship is represented by a cursor 2 on the horizontal scale and the proposed future course of the ship by a line 4 beginning at the current heading. Both axes may be calibrated in any convenient scale. As shown, the time scale is calibrated in minutes which is a sensible choice for a surface ship where the turning performance dictates an interest in future headings over a period of several minutes.

Three regions marked on this display 6, 8 and 10 indicate three heading constraints, that is headings which should be avoided for given periods of time in order to ensure that two hostile air tracks can be engaged and to avoid the risk of collision with another ship.

Each of these regions in this example has been annotated by a label 12, 14, 16 summarising the reason for the constraint. The form of presentation of these labels is chosen to match that which is already familiar to the user. In this example the top line of the label indicates the hostility (H=hostile, F=friendly) and classification (A=aircraft, S=ship, M=mines, O=oil rig, etc.) of the other vehicle (e.g. HA=Hostile Aircraft). The second line indicates the system track number of the object (that is an identity by which it is known by the computing system) and the third line identifies a weapon system of the ship (e.g. FM=forward missile, AM=aft missile) when this is associated with the constraint. Other information such as height of an aircraft also could be included if required.

Thus region 6 is a heading constraint imposed by the allocation of hostile air track '2345' to weapon 'FM'. It indicates that headings between 225 degrees and 270 degrees should be avoided between 2 minutes and 6 minutes in the future, because the earliest time of engagement of '2345' by 'FM' is 2 minutes ahead, and the last feasible time of engagement is 6 minutes. During the time of engagement (2-6 minutes from now) it is necessary that the ship should not head in the direction 225° to 260° if the weapon system FM can remain trained on the vehicle HA.

Region 8 is a heading constraint imposed by the allocation of hostile air track '1423' to weapon 'AM'. It indicates that headings between 350 degrees and 045 degrees should be avoided after 3 minutes if the weapon system AM is to remain trained on the aircraft, and that the constraint changes to a range between 010 and 065 degrees between 3 and 7 minutes in the future. In this case the target is not heading directly towards the ship so its bearing is changing with time, therefore the heading constraint changes with time and the displayed constraint region is a rhomboid instead of rectangular shape.

Region 10 is a heading constraint imposed by the risk of collision with a friendly ship, surface track '5678'. It indicates that headings between 080 degrees and 140 degrees should be avoided from 7 minutes in the future. In this case the heading constraint becomes more severe as time passes because the vessels approach one another, so the heading constraint becomes wider, until at 10 minutes the constraint extends between 100° and 170°.

As time progresses the regions representing heading constraints will move downwards towards the bottom of the display, and new constraints may be added as new threats are perceived and weapons are allocated. The regions shown are all computed based on the assumption that both the ship and the object remain on this same course and speed. If course/speed changes the display will change accordingly.

The line 4 representing the proposed course of the ship can be changed by defining a new course. This may be done by any convenient means such a typing commands at a keyboard 18, or by indicating new headings directly on the display picture via a touch screen, graphic tablet or mouse and cursor. Changes to the future course of the ship will affect the shape of collision risk regions such as region 10 and the display will provide immediate feedback of the effectiveness of a proposed course change in avoiding a potential collision. Hence the commander may define a number of proposed courses and judge from the resultant displays which is the preferred course.

Thus with the display indicated, it is possible to recognize at a glance how to steer the ship, when to steer and how much time is available within which to make manoeuvres. It will be appreciated that the display is of great assistance where there are a number of different problems such as hostile targets and collision risks for the commander to consider at the same time.

The heading constraints for a target engagement are determined by the target position and velocity and the performance of the weapon and associated sensor. The method of computing the heading constraints will now be described in the context of an engagement of an air target by a surface to air missile system with an associated target tracking radar. A missile launcher generally will have at least one blind arc within which a missile cannot be launched without endangering the ship, and the associated tracking radar will have a blind arc within which its view of a target will be obstructed by the superstructure of the ship. If these arcs overlap then they can be considered as one combined constraint. If they do not overlap then they can be considered independently as two distinct constraints. The following discussion applied to the former case.

Figure 5:
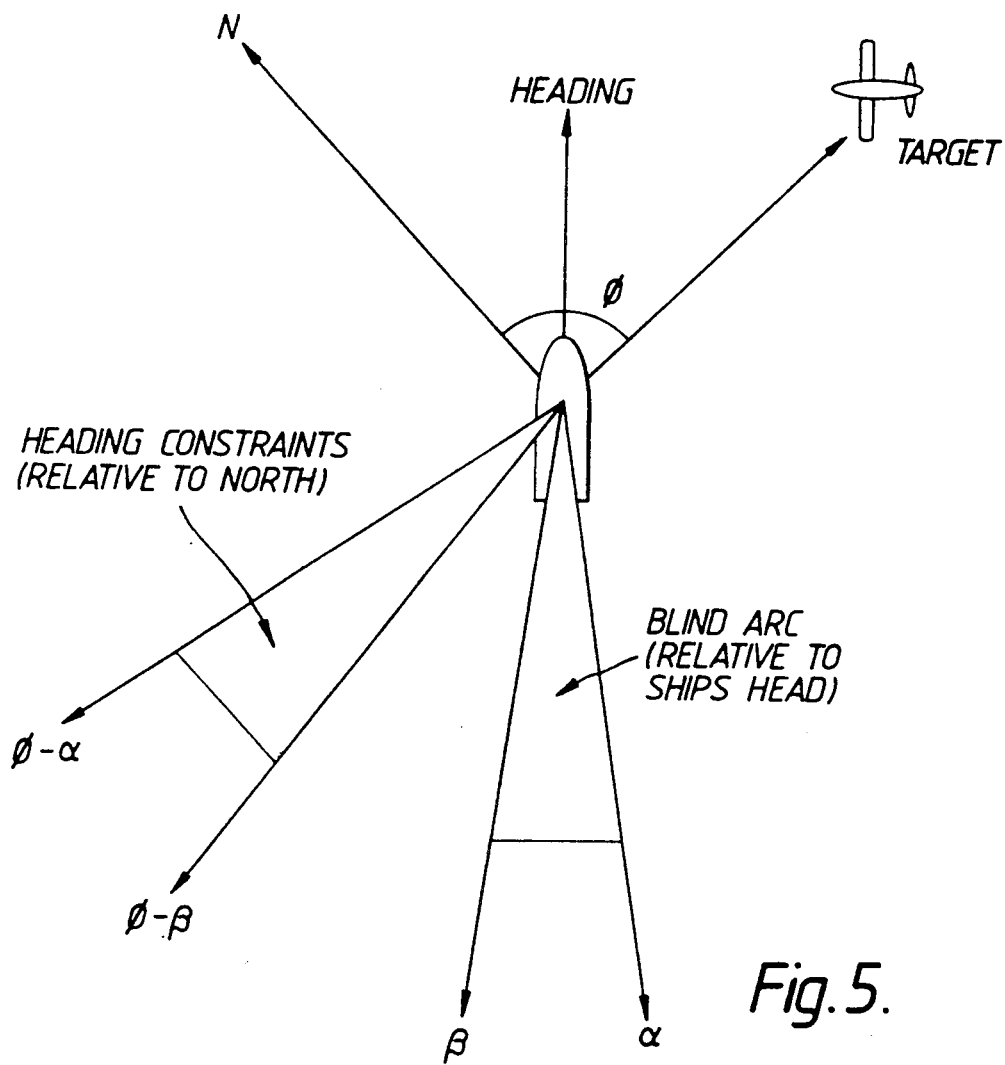

Referring to FIG. 5, given a blind arc between bearings of $\alpha$ and $\beta$ relative to the ship's heading, and a target at a true bearing of $\phi$ (relative to north), the ship must avoid steering on a heading between $\phi-\alpha$ and $\phi-\beta$ in order to keep the target outside the blind arc. Thus the heading constraints can be found by subtracting the limiting angles of the blind arc (relative to the ships head) from the true (compass) bearing of the target.

The time period over which the heading constraint applies will be determined by the speed of approach of the target and the weapon performance. The earliest time will be the time at which the target must be detectable by a radar in order to achieve a successful engagement at the greatest possible range of the weapon, and the latest time will be the last opportunity for a successful engagement at the shortest effective range of the weapon.

If a target is travelling directly towards, or away from the own ship then the constraint will be represented by a simple rectangular shape such as region 6 in FIG. 3. Otherwise the constrant will be represented by a rhomboid such as region 8 because the target bearing will be changing with time. The constraints can be calculated quite simply from a knowledge of the position and velocity of the target, the range of the missile radar, the missile speed, and least and greatest effective range and blind arcs.

Figure 6:
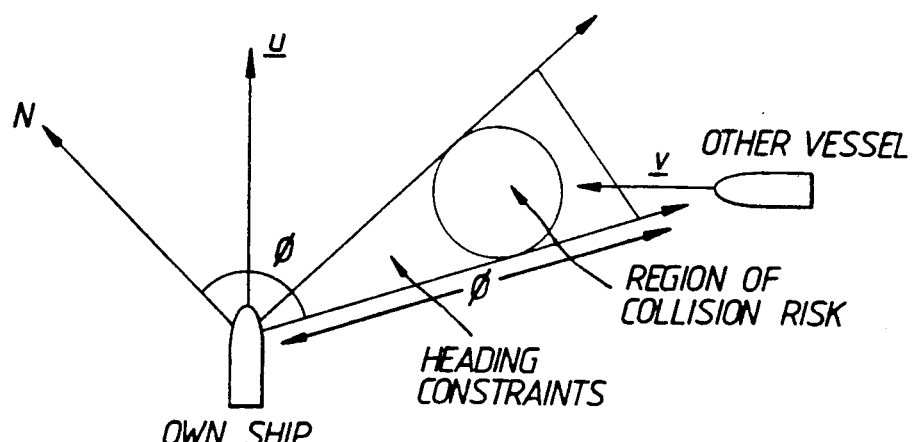

FIG. 6 illustrates the situation of the risk of collision with another vessel, e.g. an oil tanker which is moving with a velocity vector v at a distance d and bearing $\phi$ relative to ship S, which has a velocity vector u. If there is a direction in which the ship can steer to intercept the other vessel, then there is a risk of collision in that direction. Assuming that collision risk is defined in terms of "miss distance" (i.e. distance at closest point of approach) then it is a simple matter to calculate the heading constraints, and the time over which the risk would exist, from a knowledge of the above factors.

Figure 4:
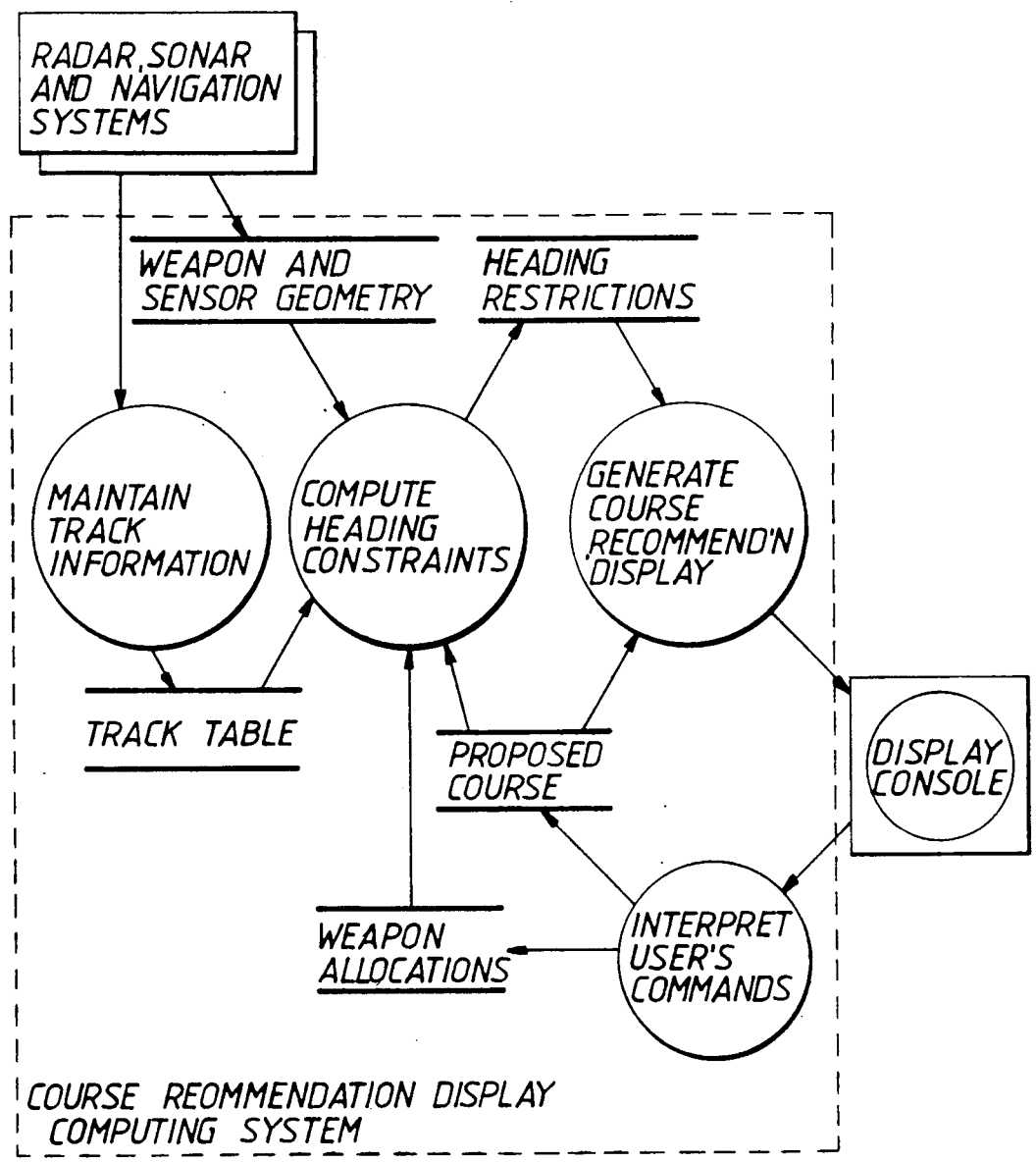
FIG. 4 is a flow chart showing the method of operation of the system according to this invention; and, FIGS. 5 and 6 are diagrams of typical situations which arise in computing the heading constraints to be displayed as in FIG. 3.

FIG. 4 is a schematic view of course recommendation display computing system according to the invention, showing the main data and processing elements and the information flow between them.

'Maintain track information' is a process which maintains the internal database called the 'track table' from information provided by radar and sonar and possibly external sources received via datalinks. Knowledge of the position and motion of the own ship is required for this process, and is obtained from the navigation system.

'Compute heading constraints' is a process which computes the heading constraints and the times over which they apply, given the weapon allocations, the positions and velocities of targets and own ship and the weapon and sensor blind arcs in the manner described above.

'Generate course recommendation display' is a process which generates a definition of the course recommendation display picture in the form required by the display system.

'Interpret user's commands' is an interfacing process which accepts commands from the user to allocate weapons to targets, and to define the proposed future course, and stores that information in the appropriate data areas.

'Track table' is a data area containing the current best estimates of the positions and velocities of all objects such as ships, aircraft or missiles which have been detected by radar or sonar, or possibly from information received via data links. It also contains the position and velocity of the own ship, derived from the navigation system.

'Weapon and sensor geometry' is a data area which contains the weapon and sensor blind arc information.

'Heading constraints' is a data area which contains a list of all the heading constraints currently imposed by weapon allocations or collision risks, along with the time periods over which the constraints apply.

'Proposed course' is a data area which contains the intended future course of the own ship.

I claim:

1. A command and control system for a vessel, the system including:
   (1) detection means for detecting an object which may be hostile to the vessel;
   (2) a weapon system including a munition firing means;
   (3) a computing system coupled to said detection means and including processing means for calculating a range of future time intervals and a range of headings for said vessel, in which ranges the weapon system cannot engage said object;
   (4) a visual display system coupled to said computing system and including a visual display unit (VDU) for providing a display for use in selection of a course for said vessel;
   (5) said display system providing a display having a first co-ordinate, representing heading of the vessel, and a second co-ordinate representing future time, said display having at least one region thereon representing said ranges to indicate heading constraints to be considered when selecting a course for said vessel whereby if during said range of future time intervals, said range of headings is avoided, said weapon system may remain engaged with said object.

2. A system as claimed in claim 1, wherein said detection means comprises a radar system included within said weapon system.

3. A system as claimed in claim 2, wherein the system further includes a means for detecting objects with which there is a risk of collision;
   said computing system being coupled to said radar system, said processing means being such as to calculate a second range of future time intervals and a second range of headings for said vessel, in which ranges there is a significant risk of collision with one of said objects;
   and said display system having at least one second region thereon representing said second ranges to indicate heading constraints to be considered when selecting a course for said vessel whereby if during said second range of future time intervals, said second range of headings is avoided, the risk of collision with said one of said objects will be avoided.

4. A system as claimed in claim 3 wherein said computing system includes means for providing indications on said display for differentiating between said first and second regions.

5. A system as claimed in claim 1 wherein said computing system includes means for indicating on the display a proposed course for said vessel.

6. A system as claimed in claim 1 wherein said first and second co-ordinates are displayed in cartesian co-ordinates.

7. A system as claimed in claim 1 including manual data entry means for entering a proposed course of said vessel into the system, coupled to said computing system.

* * * * *